United States Patent
Buckley et al.

(10) Patent No.: US 11,568,047 B2
(45) Date of Patent: Jan. 31, 2023

(54) DISTINGUISHED NEST-BASED ACCESS CONTROL

(71) Applicant: Oracle International Corporation, Redwood Shores, CA (US)

(72) Inventors: Alexander R. Buckley, Cupertino, CA (US); John R. Rose, San Jose, CA (US); Daniel Lee Smith, Spanish Fork, UT (US); David Colin Holmes, Jacobs Well (AU); Lai Hung Mandy Chung, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 204 days.

(21) Appl. No.: 17/003,768

(22) Filed: Aug. 26, 2020

(65) Prior Publication Data

US 2022/0067152 A1   Mar. 3, 2022

(51) Int. Cl.
  G06F 21/55       (2013.01)
  G06F 21/52       (2013.01)
  (Continued)

(52) U.S. Cl.
  CPC .......... G06F 21/554 (2013.01); G06F 9/4492 (2018.02); G06F 9/44589 (2013.01); G06F 11/302 (2013.01); G06F 11/3495 (2013.01); G06F 11/36 (2013.01); G06F 21/52 (2013.01); G06F 21/552 (2013.01); G06F 2221/033 (2013.01)

(58) Field of Classification Search
  CPC .. G06F 21/554; G06F 9/4492; G06F 9/44589; G06F 11/302; G06F 11/3495; G06F 11/36; G06F 21/52; G06F 21/552; G06F 2221/033

USPC .................................................. 717/124–136
See application file for complete search history.

(56) References Cited

U.S. PATENT DOCUMENTS 5,684,984 A * 11/1997 Jones .................... G06F 16/275
                                                  707/613
6,633,888 B1 * 10/2003 Kobayashi ............... G06F 8/34
                                                  707/999.102

(Continued)

OTHER PUBLICATIONS

Austin et al, "Efficient Detection of All Pointer and Array Access Errors", ACM, pp. 290-301 (Year: 1994).*

(Continued)

*Primary Examiner* — Anil Khatri
(74) *Attorney, Agent, or Firm* — Invoke

(57) ABSTRACT

Techniques for determining and displaying error messages including a cause of an error generated because two types are not members of the same nest are disclosed. The system detects, at runtime, an instruction in a first type that attempts to access a private member of a second type. The system evaluates one or more nestmate criteria to determine whether the first type and the second type are within a same nest. A nest host corresponding to the nest specifies each nest member of the nest, and each nest member specifies an association with the nest. Responsive to determining that a particular nestmate criterion is not met, the system determines that the first type and the second type are not within the same nest and records or displays data identifying the particular nestmate criterion that has not been met, and throws an access error.

39 Claims, 7 Drawing Sheets

(51) Int. Cl.
*G06F 11/34* (2006.01)
*G06F 11/30* (2006.01)
*G06F 11/36* (2006.01)
*G06F 9/448* (2018.01)
*G06F 9/445* (2018.01)

(56) References Cited

U.S. PATENT DOCUMENTS

| | | | | |
|---|---|---|---|---|
| 7,096,465 | B1* | 8/2006 | Dardinski | G05B 19/0426 |
| | | | | 717/121 |
| 7,316,010 | B1* | 1/2008 | Daynes | G06F 9/45516 |
| | | | | 717/148 |
| 8,527,946 | B2* | 9/2013 | Vaziri-Farahani | G06F 9/4488 |
| | | | | 717/114 |
| 9,251,372 | B1* | 2/2016 | Lahoz | H04L 63/04 |
| 10,367,822 | B2* | 7/2019 | Buckley | H04L 63/105 |
| 10,983,771 | B1* | 4/2021 | Hegarty | G06F 8/437 |
| 11,157,242 | B2* | 10/2021 | Gray | H04L 63/0807 |
| 11,182,191 | B2* | 11/2021 | Panse | G06F 9/5077 |
| 11,237,958 | B1* | 2/2022 | Schatzl | G06F 12/0891 |
| 11,288,045 | B1* | 3/2022 | Hegarty | G06F 9/44521 |
| 11,347,487 | B2* | 5/2022 | Chung | G06F 8/30 |

OTHER PUBLICATIONS

Nanevski et al, "Verification of Information Flow and Access Control Policies with Dependent Types", IEEE, pp. 165-179 (Year: 2011).*

Painchaud et al, "On the Implementation of a Stand-Alone JavaTM Bytecode Verifier", IEEE, pp. 189-194 (Year: 2000).*

Katterlin et al, "Prediction and Trace Compression of Data Access Addresses through Nested Loop Recognition", ACM, pp. 94-103 (Year: 2008).*

Lim et al, "Blocking and Array Contraction Across Arbitrarily Nested Loops Using Affine Partitioning", ACM, pp. 103-112 (Year: 2001).*

Liang et al, "Dynamic Class Loading in the Java Virtual Machines", ACM, pp. 36-44 (Year: 1998).*

Barowski et al, "Extraction and Use of Class Dependency Information for Java", IEEE, pp. 1-7 (Year: 2002).*

* cited by examiner

DISTINGUISHED NEST-BASED ACCESS CONTROL

TECHNICAL FIELD

The present disclosure relates to access control errors. That is, errors associated with illegal attempts by one piece of code to access another piece of code. In particular, the present disclosure relates to recording or displaying a reason for classifying an access attempt as illegal.

BACKGROUND

In object-oriented programming, a class can traditionally constrain access to its members by declaring them as private. Only code in the class itself can access the class's private members, that is, read or write a private field, or invoke a private method. In addition, some object-oriented programming languages allow the members of a class to themselves be classes, not just fields and methods. A class that is a member of another class is called a "nested" class; it may be declared private like any other member. A private nested class (and its members) may only be accessed by code in the "enclosing" class that declares it as a member, and by code in other nested classes of that enclosing class. In some environments, the family of nested classes that are all declared as members of the same enclosing class are referred to as a "nest". Access from one class in the nest to another class in the nest is achieved by having each class record, statically, the nest to which the class belongs. However, classes can be produced independently of each other, and thus become out of sync. In particular, a class may record that it belongs to a nest while other classes in the nest believe that it does not. When the class tries to access a private member in one of those other classes, the system will disallow the access and throw an exception.

It is typically unclear to the user why the exception is being thrown. That is, there are myriad reasons that such an exception may be thrown, and this is compounded by a large number of classes. A developer can only remedy the exception if he or she can reconstruct the access attempt, which relies on being able to answer these questions.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
   2.1 EXAMPLE CLASS FILE STRUCTURE
   2.2 EXAMPLE VIRTUAL MACHINE ARCHITECTURE
   2.3 LOADING, LINKING, AND INITIALIZING
3. ACCESS CONTROL
4. ILLEGAL ACCESS ERROR
5. NESTED CLASSES
   5.1 NESTED CLASSES USING HELPER MEMBERS
   5.2 NESTED CLASSES USING NESTS
   5.3 DETERMINING A NEST HOST
6. NESTMATE TEST
7. MISCELLANEOUS; EXTENSIONS
8. HARDWARE OVERVIEW

1. General Overview

One or more embodiments include methods for distinguishing nest-based access control. The system provides the ability to recover the underlying reason for why access to a private member is disallowed. An accessor type, as referred to herein, includes an instruction that is attempting an access. An accessee type, as referred to herein, includes a a private member (e.g., field, method, or class) that is being accessed. The accessor may be permitted to access the private member if the accessor and the accessee are nestmates (e.g., they share a common nest host).

A type's membership of a nest is determined either by the system during or prior to an access control procedure, or by and application programmable interface (API). Typically, the type will nominate or otherwise indicate a nest host of the type by specifying a nest host attribute in a class file associated with the type. If the system or the API cannot find the indicated nest host, or if the indicated nest host specifies that the type is not in fact a member, then the system or API may consider the type to reside in its own nest. Accordingly, if the type attempts to access the private member of any other type, the system may throw an illegal access error, because the accessing type is not in the same nest as the accessee type. The system or API may record, in a program-accessible and/or user-accessible manner, a cause of the determination that the type resides in its own nest.

One or more embodiments described in this Specification and/or recited in the claims may not be included in this General Overview section.

2. Architectural Overview

Figure 1:
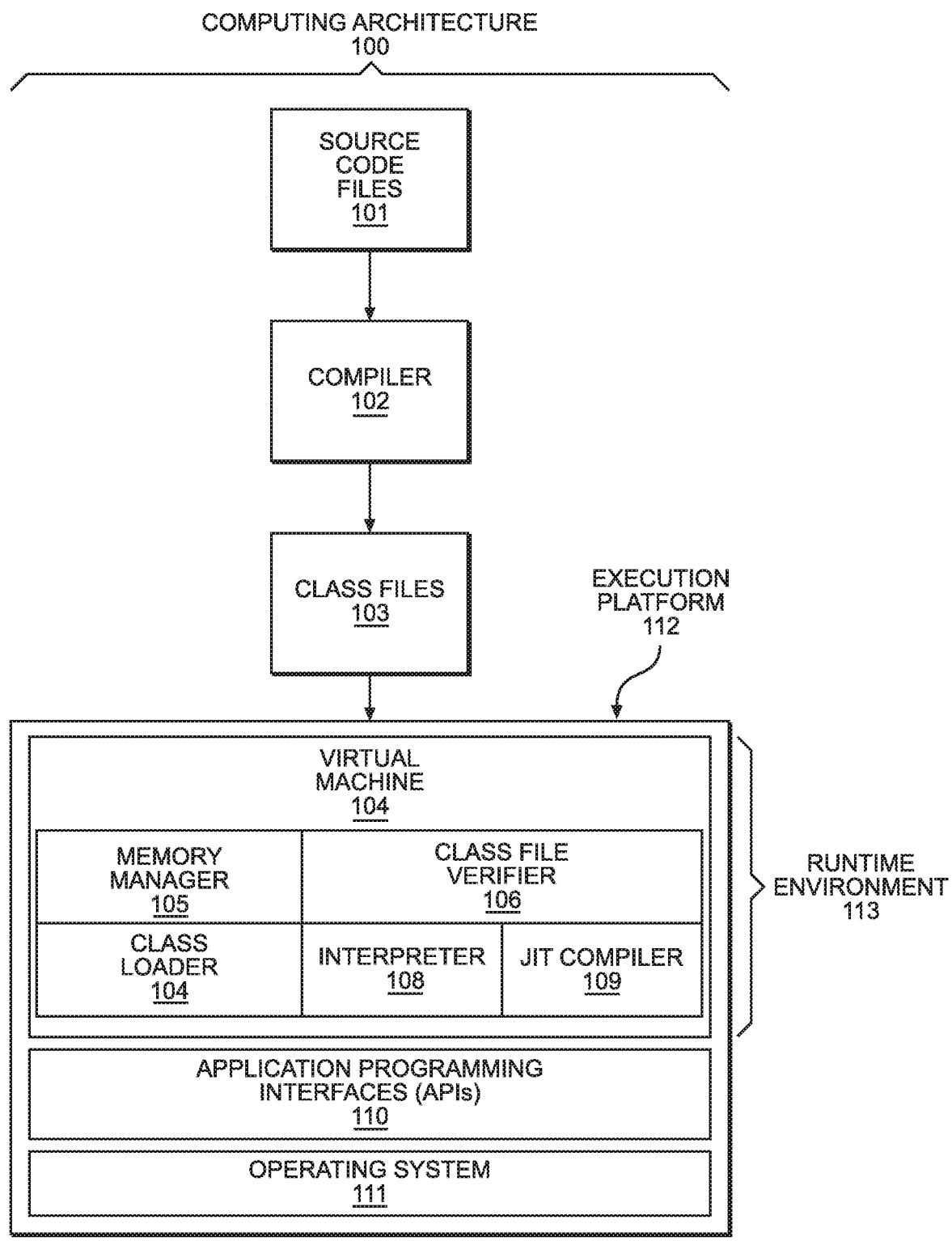
FIG. 1 illustrates an example computing architecture in which techniques described herein may be practiced.

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
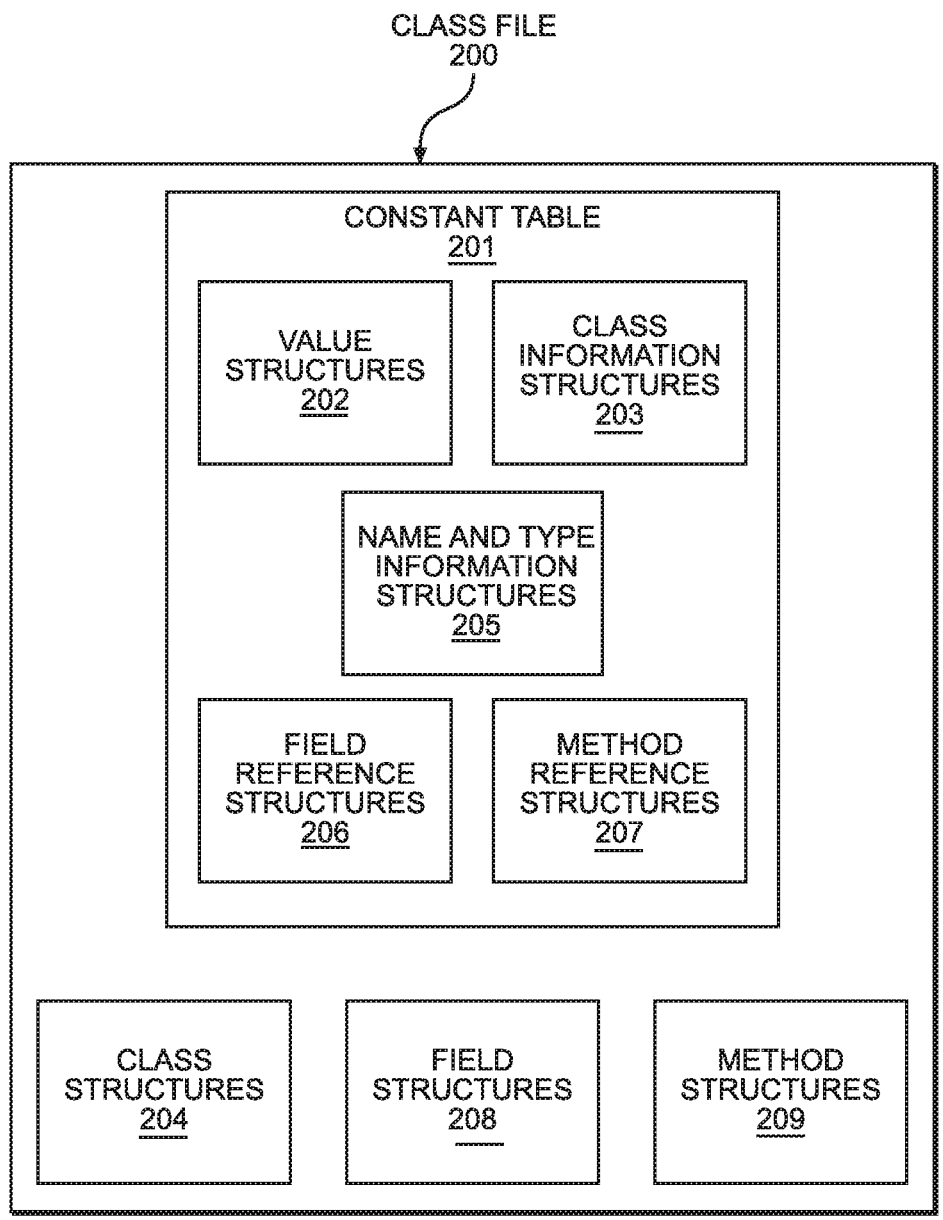
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { ... }" matches the descriptor "(I D L Thread) L Object".

In an embodiment, the virtual machine instructions held in the method structures 209 include operations which reference entries of the constant table 201. Using Java as an example, consider the following class:

```
class A
{
  int add12and13( ) {
    return B.addTwo(12, 13);
  }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
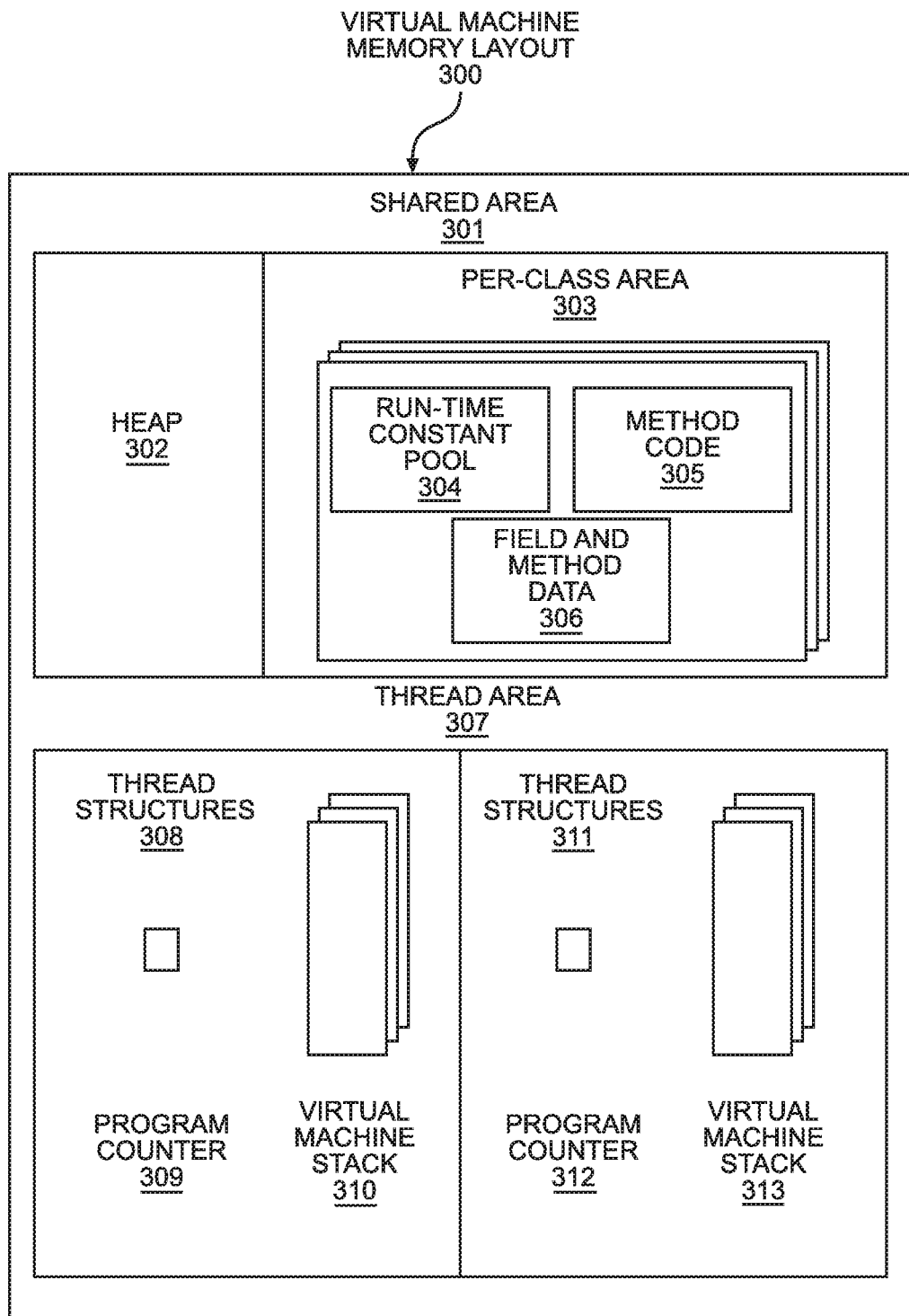
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
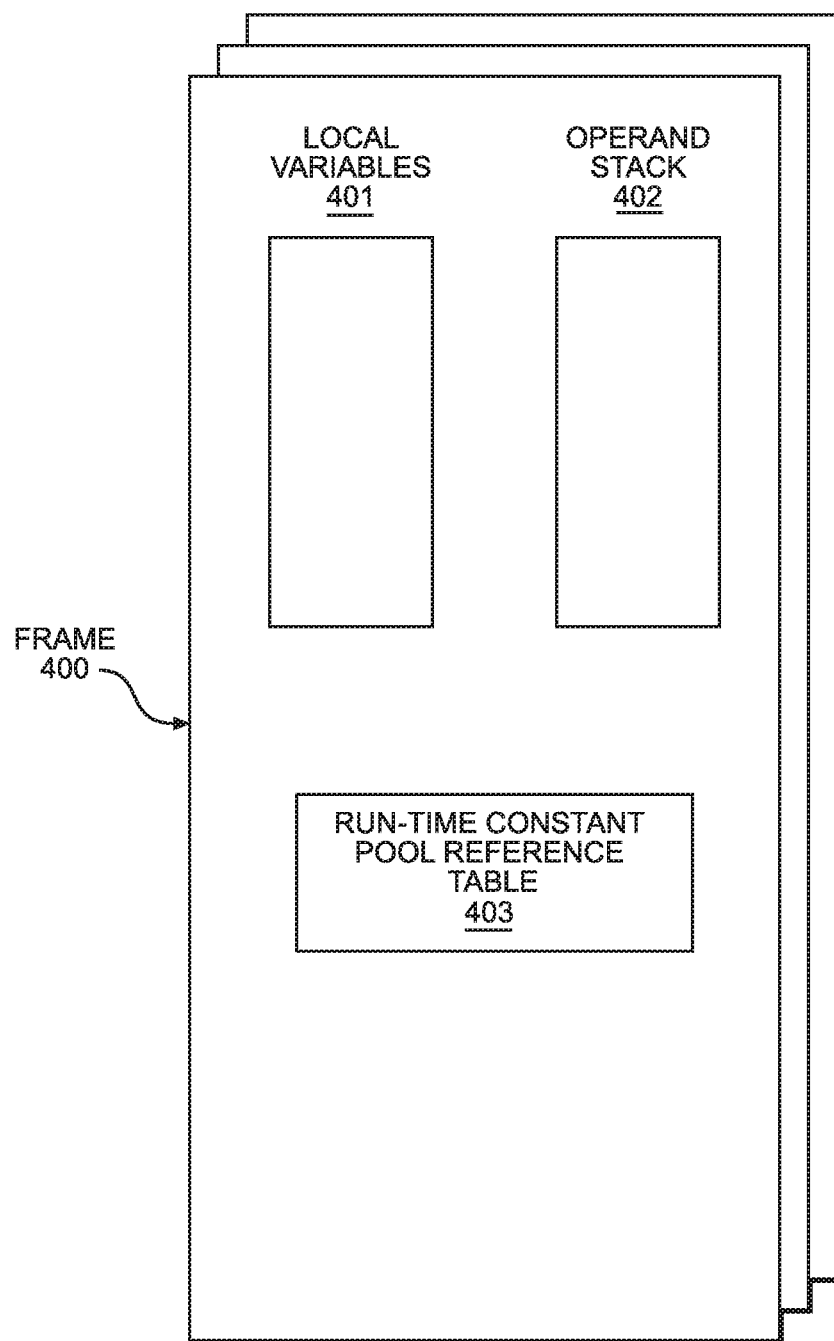
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Access Control

Access control may be a selective restriction to access (e.g., reading from, storing to, or executing) a member (e.g., a field, method, or nested class) of a type. Each type and/or each member of a type may be associated with an access specifier. The access specifier may specify which other types may access the associated type and/or member. As a particular example, the Java programming language includes, among other access specifiers, public and private. Types and/or members associated with the access specifier public may be accessed by any other code. Types and/or members associated with the access specifier private may be accessed only by instructions within the type. Additionally, types and/or members not associated with any access specifier are accessible to any type within the same package.

Accessee source code may declare an accessee type, which includes one or more members. The accessee type may be associated with an access specifier. Additionally, each of the one or more members of the accessee type may be associated with an access specifier. At compile time, the compiler may emit a class file associated with the accessee source code, which includes the access specifier associated with the accessee type and the access specifier associated with each member of the accessee type.

Accessor source code may declare an accessor type (e.g., a class) that includes one or more instruction which access (e.g., read from, write to, or execute) a particular member of the accessee type. At compile time, the compiler may perform initial access control operations. In particular, the system may determine, based on the access specifier of the accessee type, whether or not the accessor type is permitted to access the accessee type. If the accessor type is not permitted to access the accessee type, the system may throw an error and the compiler may halt compilation in response to the error.

If the system determines that the accessor type is permitted to access the accessee type, the system may further determine, based on access specifier associated with the particular member of the accessee type, whether or not the accessor type is permitted to access the particular member. If the accessor type is not permitted to access the particular member, the system may throw an error and the compiler may halt compilation. If the accessor type is permitted to access the particular member, the compiler may emit a class file associated with the accessor type.

At runtime, the virtual machine may perform additional access control operations. In particular, an accessee class file associated with an accessee type may be loaded in the virtual machine. Independently, an accessor class file associated with an accessor type may be loaded in the virtual machine. The system may determine, based on the access specifier of the accessee type, whether or not the accessor type is permitted to access the accessee type. If the accessor type is not permitted to access the accessee type, the system may throw an error and the virtual machine may halt execution in response to the error. If the system determines that the accessor type is permitted to access the accessee type, the system may further determine, based on access specifier associated with the particular member of the accessee type, whether or not the accessor type is permitted to access the particular member. If the accessor type is not permitted to access the particular member, the system may throw an error and the virtual machine may halt execution. If the accessor type is permitted to access the particular member, the virtual machine may access (e.g., read from, store to, or execute) the member.

4. Illegal Access Error

If, at runtime, an accessor type attempts to access a private member of another type, the virtual machine may deny access to the private member. As discussed above, the virtual machine may throw an error and may halt execution of the accessor. As an example, in the Java platform, the virtual machine may throw an IllegalAccessError exception. The IllegalAccessError is a standard Java exception. The IllegalAccessError may indicate that the accessor is not permitted to access the member. In some embodiments, this may occur when the accessor is unaware of the structure of the accessee type. In other embodiments, this may occur the accessee type is altered to change an access specifier of a member to a more restrictive access specifier (e.g., from public to private).

5. Nested Classes

A source code file may declare a first class that further declares, within the lines of code that make up the first class, a second class. The first class may be known as an enclosing class, while the second class may be known as a nested class. The scope of the nested class may be bounded by the declaration of the enclosing class. The second class may further declare, within its lines of code, a third class; in this case, the second class is both a nested class (within the first class) and an enclosing class (for the third class). Using Java as an example, consider the following declaration:

```
public class Enclosing {
    private int f = 1;
    private class Nested {
        int g = f;
    }
    void m( ) {
        ... new Nested( ) ...
    }
}
```

In embodiments, the class Enclosing and the class Nested may each be associated with an access specifier. In embodiments, the access specifier may be different for the nested class than for the enclosing class. For example, as set forth in the example above, the class Enclosing is public (e.g., using the public access specifier), while the class Nested is private (e.g., using the private access specifier).

When compiling the source code file, the compiler may emit a class file for each class declared within the source code file. That is, for the example provided above, the compiler may emit a first class file Enclosing.class. The compiler may also emit a second class file Enclosing$Nested.class. That is, even though the source code of a class may declare multiple (nested) classes, the class file emitted for the class represents one and only one class declaration.

5.1 Nested Classes Using Helper Members

At runtime, the virtual machine is presented with two separate class files (e.g., Enclosing.class, and Enclosing$Nested.class). The class files are loaded independently, and may be loaded at different times. As shown above, the access specifier associated with the class Nested is private. Correspondingly, the class file emitted for the class Nested (e.g., Enclosing$Nested.class) includes the designation of private accessibility. However, the virtual machine historically did not acknowledge the possibility of inter-class relationships whereby nested classes could enjoy mutual privileged access with their enclosing classes. In order to allow for access to a private nested class by its enclosing class, the compiler is required to emit class files having a particular format.

In particular, the class file emitted by the compiler for a private nested class may indicate that the nested class does not have private accessibility, and further may include one or more special helper members. Including a special helper member allows the instructions of the enclosing class to access the private nested class. The compiler may use an intermediate access specifier, other than private and public, to make special helper members inaccessible to some classes that might otherwise have access to such helper members, were they marked public.

For example, the class Enclosing includes an instruction that accesses the class Nested (e.g., the instruction new Nested ( ) as shown above). The enclosing class is permitted to access private members of the nested class, such as the implicit constructor of class Nested which takes no arguments. The compiler would ordinarily emit a constructor in Enclosing$Nested.class that has the private access specifier, but given the presence of the instruction new Nested ( ) in the class Enclosing, the compiler may emit a special helper member in Enclosing$Nested.class, such as a constructor that does not have the private access specifier and is therefore accessible to the class Enclosing.

The class file emitted by the compiler for the enclosing class may also include special helper members. Including a special helper member allows the instructions of the nested class to access the enclosing class. For example, as shown above, the class Enclosing declares a private member, private int f=1, which is used by an instruction in the class Nested, int g=f. The nested class is permitted to access private members of the enclosing class, such as the field f. The compiler emits a special helper member, such as a method, in Enclosing.class for access to the private member by the class Nested. The special helper member is not itself private, and has a name which is not disclosed to classes other than those which are nested classes of the enclosing class. Accordingly, helper members may be generated by the compiler for each member of a private class and/or each private member of a public class.

A non-private special helper member may require that a secret key value be passed as an argument when calling a special helper member for accessing a private member. The secret key value may be provided to nested classes associated with the enclosing class. Thus, the non-private helper member is created by the compiler. The virtual machine may only allow for public classes, where private access is implemented via the helper members which require a secret key and/or are invoked with a secret name. Although such special helper members embody private cooperation between classes, such cooperation cannot be made perfectly private, if a third class obtains the secret key or the secret name of a special helper member.

5.2 Nested Classes Using Nests

Rather than controlling access to private nested classes by using helper members, access control may be achieved by having the nested classes become members of a "nest" at run time. In a run-time nest, the enclosing class may serve as a "host" of the nest, while one or more nested classes may be "members" of the nest.

A nest may be a set of types (e.g., classes) that allow mutual access to private members associated therewith. For example, an enclosing class and one or more nested classes enclosed by the enclosing class may form a nest. Membership of a class or other type to a particular nest may be determined either by the system (e.g., a Java virtual machine) during or prior to access control, or by an API (such as Lookup::defineHiddenClass). Typically, the type will nominate a nest host corresponding to a nest to which the type should belong by specifying a nest host attribute in a class file associated with the type.

Because the class files associated with the types that make up the nest include attributes indicating the nesting relationships between the types, the virtual machine may operate with knowledge of these relationships. In particular, the virtual machine may allow for nest members to access private members of the nest host. Moreover, this may be accomplished without the use of any helper members or secret key arguments.

In particular, in response to a request by an accessor class to access a private member of an accessee type, the virtual machine may perform a nestmate test to determine if the accessor is in the same nest as the accessee type.

When compiling source code that includes an enclosing class and a nested class, the compiler may describe the desired run-time nest by storing one or more nest attributes to the emitted class files. Using Java as an example, consider the following class:

```
public class Noun {
    public class Person {...}
```

```
public Class Place {...}
public class Thing {...}
}
```

In this example, the class Noun is the nest host, and the classes Person, Place, and Thing are nest members. The source code includes an enclosing class Noun having three nested classes, Noun$Person, Noun$Place, and Noun$Thing. Accordingly, the compiler, when compiling the source code file, will emit four class files: Noun.class, Noun$Person.class, Noun$Place.class, and Noun$Thing.class.

Each class file emitted by the compiler may include one or more of a nest host attribute and a nest member attribute. In particular, each enclosing class may include a nest mate attribute indicating the nested classes that are enclosed by the enclosing class. Each nested class may include a nest host attribute that indicates the enclosing class associated with the nested class. Accordingly, the class file attributes are bi-directional and cyclic. In embodiments, a class which lacks a nest host attribute may belong to a nest hosted by the class; if the class also lacks a nest member attribute, the class is a member of a singleton nest including only the class itself.

In the example provided above, the class file Noun.class associated with the enclosing class Noun (e.g., the nest host) may include a nest members attribute, indicating that the classes Noun$Person, Noun$Place, and Noun$Thing are nest members. Similarly, the class files associated with each of the nested classes (e.g., Noun$Person.class, Noun$Place.class, and Noun$Thing.class) may include a nest host attribute indicating that the class Noun is the nest host.

Alternatively or additionally, a program may define one or more classes at run time. Classes defined at run time may be designated as a host or a member of a nest, without a class file possessing any such attributes.

5.3. Determining a Nest Host

In embodiments, a nest host may be determined for purposes of access control. The nest host may be determined with a provenance. The provenance may be an indicator of a quality of the nest host determination. In embodiments, provenance increases as the system includes more positive information there is about the nest host determined for a given class.

Figure 5:
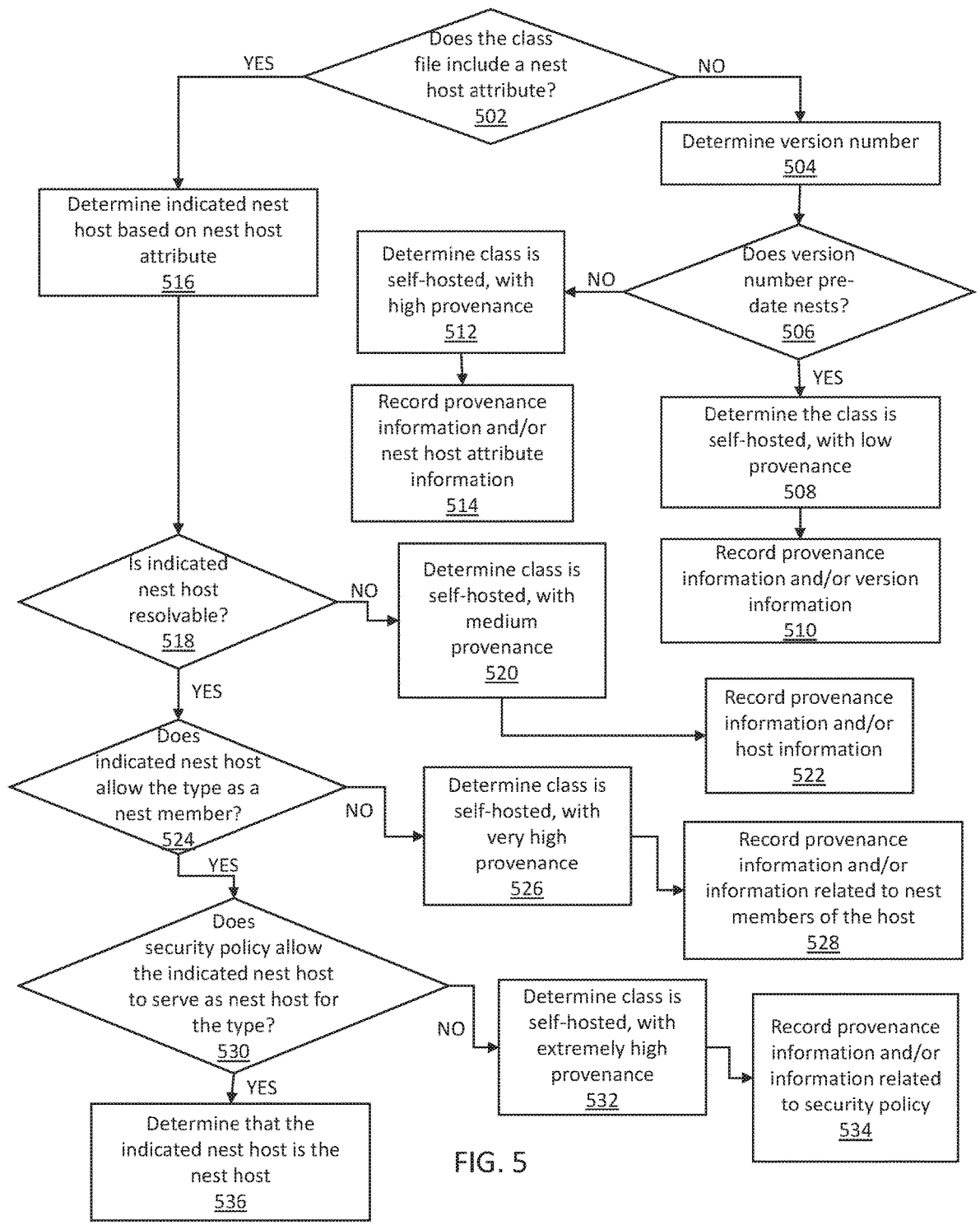
FIG. 5 illustrates a test to determine a nest host of a particular class, in accordance with one or more embodiments.

FIG. 5 illustrates a flowchart showing techniques for determining a nest host for a particular type. One or more operations illustrated in FIG. 5 may be modified, rearranged, or omitted all together. Accordingly, the particular sequence of operations illustrated in FIG. 5 should not be construed as limiting the scope of one or more embodiments.

The system may first determine if a class file associated with the particular type includes a nest host attribute (Operation 502). In some embodiments, the class file associated with a particular type is generated prior to runtime by a compiler. In other embodiments, the class file associated with the particular type may be generated dynamically at runtime. The nest host attribute may be stored as data in the class file, as discussed above.

If the class file does not include a nest host attribute (NO in Operation 502) the system may determine a version number associated with the class file (Operation 504). The system may further determine if the version number of the class file pre-dates introduction of nests in the coding language (Operation 506). Using the Java platform as an example, if the class file indicates that the Java version is lower than 45.3, the class file pre-dates the introduction of nests.

If the version number of the class file pre-dates the introduction of run-time nests (YES in operation 506), the system may determine that the nest host associated with the particular class is the particular class itself, with a low provenance (Operation 508). That is, the system may determine that the particular class is self-hosted. The provenance may be determined to be low because the class predates the presence of nests, and was never intended to reside in a nest. The system may record provenance information and/or information indicating that the class file pre-dates the nest concept (Operation 510). The recorded information may include, for example, the determined version number. Recording information may include storing the information in a particular memory location (e.g., a memory location designated as an access error cause location).

If the version number of the class file does not pre-date the introduction of nests (NO in operation 506), the system may determine that the particular class is self-hosted, with a high provenance (Operation 512). The provenance may be determined to be high because the system, at compile time, had an opportunity to nominate a nest host and determined that it was not necessary to do so. The system may record the determined provenance information and/or information indicating that the class file does not declare a nest host (Operation 514). Recording information may include storing the information in a particular memory location (e.g., the access error cause location).

If the class file does include a nest host attribute (YES in Operation 502), the system may determine a nest host indicated by the nest host attribute of the class file of the particular class (Operation 516). The system may verify that the nest host indicated in the class file of the particular type is resolvable (Operation 518). If the class file is not resolvable (NO in operation 518), the system may determine that the particular class is self-hosted, with a medium provenance (Operation 520). The provenance here is selected to be medium because the fact that the indicated nest host is unresolvable because the lack of a resolvable host may mean that a user forgot to include an intended class in the run-time environment.

The system may record provenance information and/or information associated with the unresolvable host (e.g., a name or other identifier associated with the nominated host) (Operation 522). Recording information may include storing the information in the access error cause memory location.

If the system is able to resolve the reference to the nest host of the class file associated with the particular type (YES in Operation 518), the system may determine if the nest host allows the particular type as a nest member (Operation 524). As an example, the system may inspect the class file associated with the host for a nest members attribute. The system may determine if the particular type is listed among the nest members.

If the nest host lacks a nest members attribute, or the nest members attribute does not allow the particular type as a nest member, the system may determine that the particular class is self-hosted, with very high provenance (Operation 526). The provenance may be determined to be very high because the system is able to determine that the nominated nest host does not wish for the particular class to be included in the nest. The system may record provenance information and/or information associated with the nest host (e.g., a list of the nest members allowed by the nest host) (Operation 528).

Recording information may include storing the information in the access error cause memory location.

If the system determines that the indicated nest host does allow the particular type as a nest member (YES in Operation 524), the system may further determine if one or more system security policies allow the indicated nest host to serve as a host to the particular type (Operation 530). If the system does not allow the indicated nest host to serve as host to the particular type (NO at Operation 530), the system may determine that the particular type is self-hosted, with an extremely high provenance (Operation 532). The provenance may be determined to be very high because the system includes information restricting the nominated nest host from hosting the particular type. The system may record provenance information and/or information related the one or more security policies (Operation 534). The information may include a security policy identifier and/or a description of the security policy. Recording information may include storing the information in the access error cause memory location.

Alternatively, if the one or more security policies do allow the indicated nest host to serve as host to the particular type (YES at Operation 530), the system may determine that the indicated nest host is the host of the particular type (Operation 536).

6 Nestmate Test

As discussed above, a nest may be a set of types (e.g., classes) that allow mutual access to private members associated therewith. Membership of a class or other type to a particular nest may be determined either by the system (e.g., a Java virtual machine) during or prior to access control, or by an API.

Figure 6:
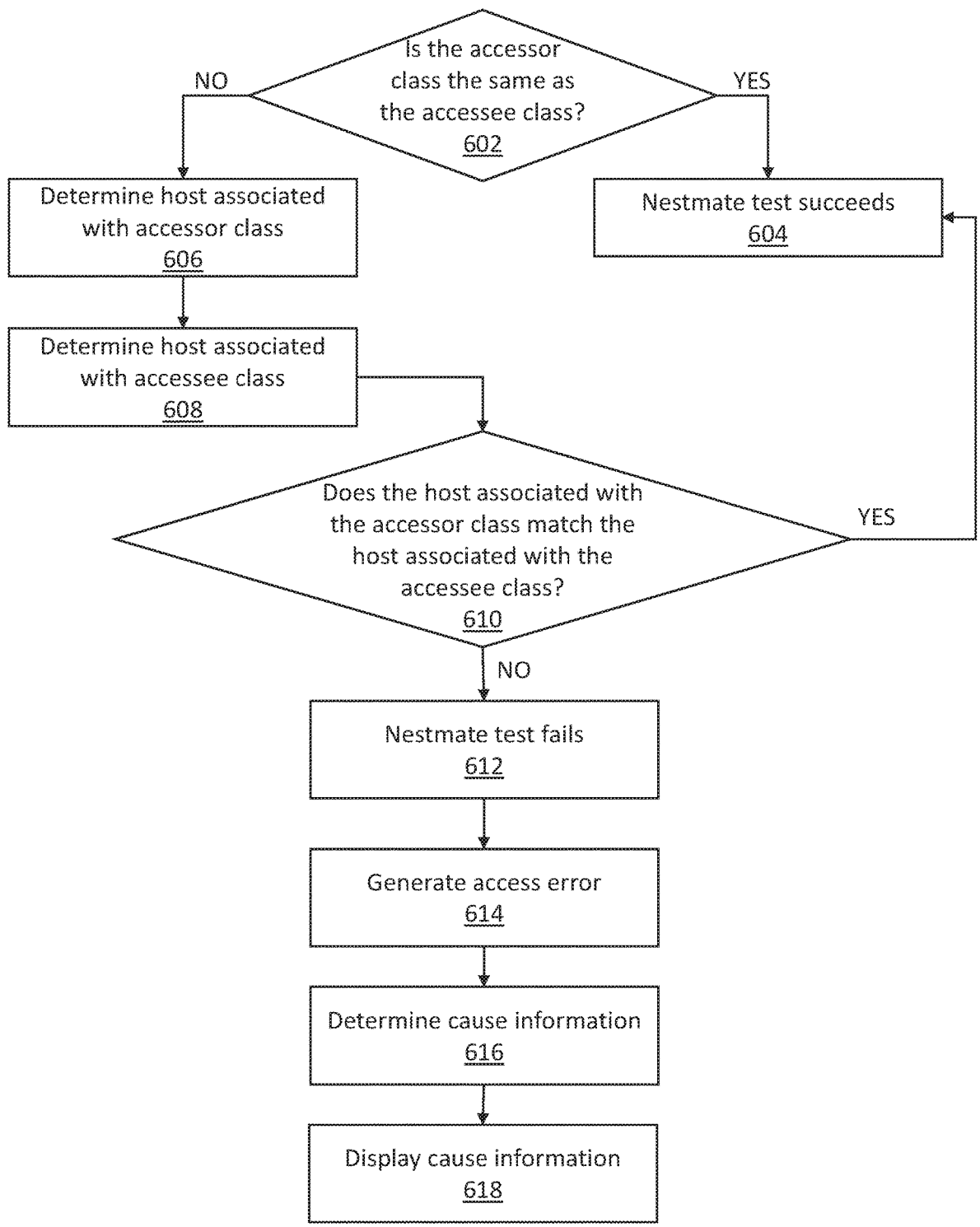
FIG. 6 illustrates a test to determine whether an accessor class and an accesses class are nestmates, in accordance with one or more embodiments.

FIG. 6 illustrates a flowchart showing techniques for determining if an accessor and an accessee are members of the same nest. One or more operations illustrated in FIG. 6 may be modified, rearranged, or omitted all together. Accordingly, the particular sequence of operations illustrated in FIG. 6 should not be construed as limiting the scope of one or more embodiments.

To determine whether an accessor belongs to the same nest as an accessee, a nestmate test is applied to examine one or more nestmate criteria. The accessor and the accessee are determined to belong to the same nest if and only if the nestmate test succeeds.

A system may determine if the accessor and the accessee are the same type (Operation 602). If the accessor and the accessee are the same type (YES at Operation 602), the nestmate test succeeds (Operation 604).

If the accessor and the accessee are not the same type (NO at operation 602), the system may determine a nest host associated with the accessor (Operation 606). For example, the nest host may be determined in accordance with the nest host test described above.

The system may determine a nest host associated with the accessee (Operation 608). Again, the system may determine the nest host associated with the accessee using the nest host test described above.

The nest host associated with the accessor is compared to the nest host associated with the accessee (Operation 610). If the nest host associated with the accessor is determined to be the same as the nest host associated with the accessee, the nestmate test succeeds (Operation 604). Otherwise, the nestmate test fails (Operation 612).

Responsive to determining that the nestmate test fails in Operation 612, the system may throw an access error indicating that the access made by the accessor to the private member of the accessee is not permitted (Operation 614). Throwing the error may include displaying or otherwise transmitting the error to a user. For example, the error may be displayed on a monitor, added to an error log, and/or electronically transmitted to an address (e.g., an email address) associated with the user.

The system may determine cause information indicating a reason that the nest hosts of the accessor and accessee do not match (Operation 616). The determination may be made based on data stored in the access error cause memory location during Operation 606. In particular, the provenance information and any other information stored at the memory location may be used to determine a reason for the self-hosting determination.

The system may determine, based on an indication of low provenance in the access error cause memory location, that the accessor predates the existence of nests in the platform. The cause information determined by the system may include a version number associated with the accessor. For example, the system may read the version from the error cause memory location. Alternatively, the system may read the version information from a class file associated with the accessor.

The system may determine, based on an indication of medium provenance in the access error cause memory location, that the nest host indicated by the accessor is unresolvable. The cause information determined by the system may include any exception that would have been thrown based on the unresolvable nest host (e.g., a class not found exception). In embodiments, the exception includes identifying information of the nominated host.

The system may determine, based on an indication of high provenance in the access error cause memory location, that the class file associated with the accessor does not nominate a nest host. The cause information determined by the system may include an indication that the accessor did not nominate a host. For example, the cause information may include an indication that the class file associated with the host does not include a nest host attribute.

The system may determine, based on an indication of very high provenance in the access error cause memory location, that the accessor is not allowed as a nest member by the nominated nest host. The cause information determined by the system may include a description of the nest members allowed by the nominated host. For example, the cause information may include a list of allowable nest members.

The system may determine, based on an indication of extremely high provenance in the access error cause memory location, that one or more security policies prevent the nominated host from serving as a host to the accessor. The cause information determined by the system may include an indication of the system security policies.

The system may display or otherwise transmit the determined cause information (Operation 618). Displaying or otherwise transmitting the cause information may include displaying or otherwise transmitting the access error and the determined cause information to the user. For example, the system may display the cause information with the access error on a monitor, add the access error and cause information to an error log, and/or electronically transmit the access error and cause information to an address (e.g., an email address) associated with the user. In some embodiments, the method of displaying or transmitting the cause information may be different from the method of displaying or otherwise transmitting the error.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
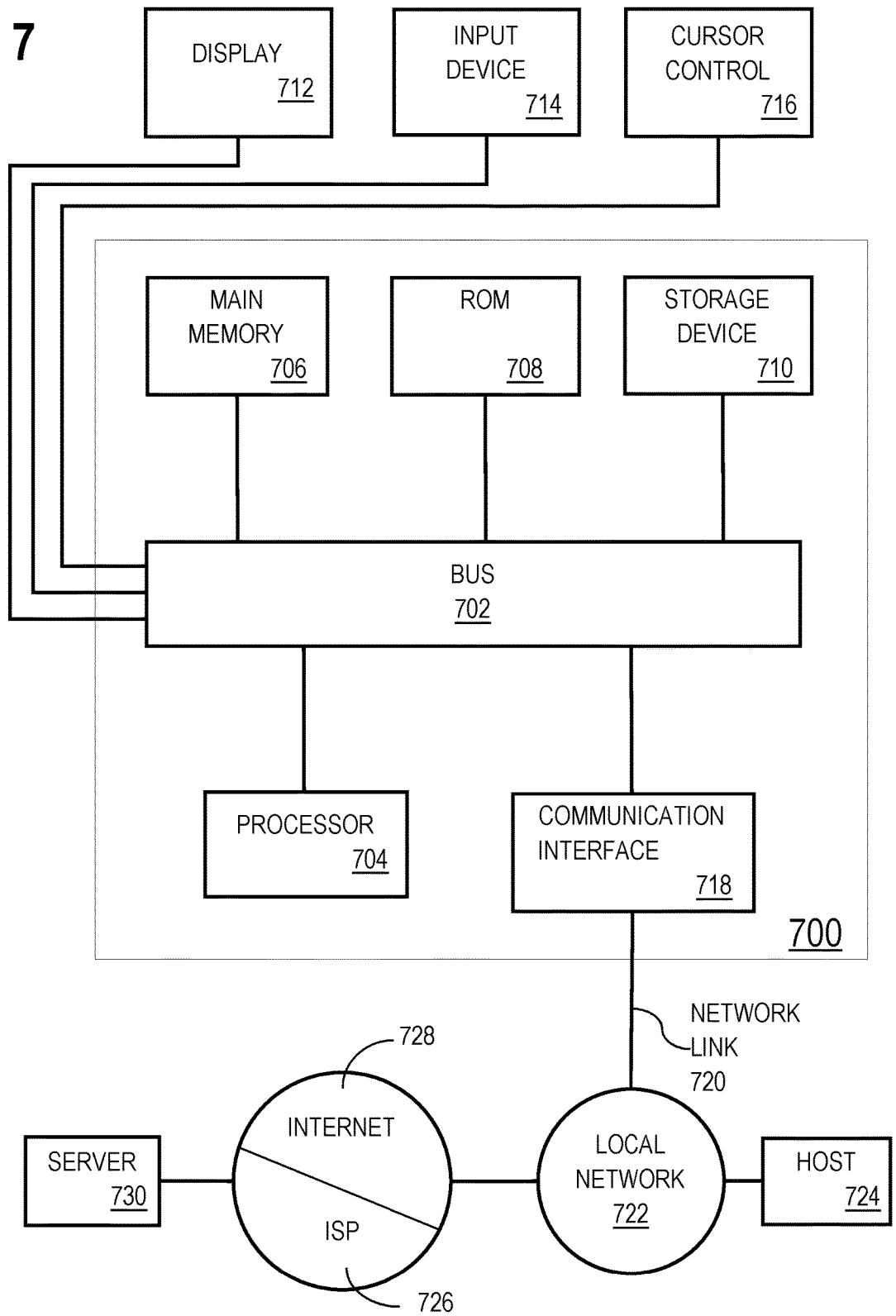
FIG. 7 illustrates a system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, causes performance of operations comprising:
   detecting, at runtime, an instruction in a first type that attempts to access a private member of a second type;
   evaluating one or more nestmate criteria to determine whether the first type and the second type are within a same nest, at least by:
      determining a nest host of the first type;
      determining a nest host of the second type;
      comparing the nest host of the first type and the nest host of the second type to determine whether the nest host of the first type is the same as the nest host of the second type;
      wherein a nest host corresponding to the nest specifies each nest member corresponding to the nest, and wherein each nest member corresponding to the nest specifies an association with the nest;
   responsive to determining that a particular nestmate criterion, of the one or more nestmate criteria, is not met, determining that the first type and the second type are not within the same nest;
   responsive to determining that the first type and the second type are not within the same nest:
      recording or displaying data identifying the particular nestmate criterion that has not been met; and
      throwing an access error.

2. The one or more media of claim 1, wherein determining that the particular nestmate criterion has not been met comprises determining that a nest host nominated by the first type is unresolvable, and wherein the data identifying the particular nestmate criterion that has not been met comprises an exception indicating that the nest host nominated by the first type is unresolvable.

3. The one or more media of claim 1, wherein determining that the particular nestmate criterion has not been met comprises determining that a nest host nominated by the first type is resolvable, and wherein the nest host nominated by the first type does not include a nest member attribute and wherein the data identifying the particular nestmate criterion that has not been met comprises data indicating that the nest host nominated by the first type does not include a nest member attribute.

4. The one or more media of claim 1, wherein determining that the particular nestmate criterion has not been met comprises determining that a nest host nominated by the first type is resolvable, and that a nest member attribute of the nest host nominated by the first type does not include the first type and wherein the data identifying the particular nestmate criterion that has not been met comprises data indicating that the nest member attribute of the nest host nominated by the first type does not include the first type.

5. The one or more media of claim 1, wherein determining that the particular nestmate criterion has not been met comprises determining that a nest host nominated by the second type is unresolvable, and wherein the data identifying the particular nestmate criterion that has not been met comprises an exception indicating that the nest host nominated by the second type is unresolvable.

6. The one or more media of claim 1, wherein determining that the particular nestmate criterion has not been met comprises determining that a nest host nominated by the second type is resolvable, and wherein the nest host nominated by the second type does not include a nest member attribute and wherein the data identifying the particular nestmate criterion that has not been met comprises data indicating that the nest host nominated by the second type does not include a nest member attribute.

7. The one or more media of claim 1, wherein determining that the particular nestmate criterion has not been met comprises determining that a nest host nominated by the second type is resolvable, and that a nest member attribute of the nest host nominated by the second type does not include the second type and wherein the data identifying the particular nestmate criterion that has not been met comprises data indicating that the nest member attribute of the nest host nominated by the second type does not include the second type.

8. The one or more media of claim 1, wherein determining that the particular nestmate criterion has not been met comprises determining that nestmate data associated with the second type disallows access by the first type, and wherein the data identifying the particular nestmate criterion that has not been met comprises an indication that the data associated with the second type disallows access by the first type.

9. The one or more media of claim 1, wherein determining that the particular nestmate criterion has not been met comprises determining a security policy preventing the first type from being a nestmate with the second type, and wherein the data identifying the particular nestmate criterion that has not been met comprises a description of the determined security policy.

10. The one or more media of claim 1, wherein determining that the particular nestmate criterion has not been met comprises determining that the first type has a version number pre-dating use of run-time nests, and wherein the data identifying the particular nestmate criterion that has not been met comprises (a) a name of the first type and (b) a version number of the first type.

11. The one or more media of claim 1, wherein determining that the particular nestmate criterion has not been met comprises determining that the second type has a version number pre-dating use of run-time nests, and wherein the data identifying the particular nestmate criterion that has not been met comprises (a) a name of the second type and (b) a version number of the second type.

12. The one or more media of claim 1, wherein the operations further comprise determining a nest host of the first type to be the first type.

13. The one or more media of claim 1, wherein the data identifying the particular nestmate criterion that has not been met comprises at least one of the nest host of the first type or the nest host of the second type.

14. A method comprising:
detecting, at runtime, an instruction in a first type that attempts to access a private member of a second type;
evaluating one or more nestmate criteria to determine whether the first type and the second type are within a same nest, at least by:
determining a nest host of the first type;
determining a nest host of the second type;
comparing the nest host of the first type and the nest host of the second type to determine whether the nest host of the first type is the same as the nest host of the second type;
wherein a nest host corresponding to the nest specifies each nest member corresponding to the nest, and wherein each nest member corresponding to the nest specifies an association with the nest;
responsive to determining that a particular nestmate criterion, of the one or more nestmate criteria, is not met, determining that the first type and the second type are not within the same nest;
responsive to determining that the first type and the second type are not within the same nest:
recording or displaying data identifying the particular nestmate criterion that has not been met; and
throwing an access error;
wherein the method is performed by at least one device including a hardware processor.

15. The method of claim 14, wherein determining that the particular nestmate criterion has not been met comprises determining that a nest host nominated by the first type is unresolvable, and wherein the data identifying the particular nestmate criterion that has not been met comprises an exception indicating that the nest host nominated by the first type is unresolvable.

16. The method of claim 14, wherein determining that the particular nestmate criterion has not been met comprises determining that a nest host nominated by the first type is resolvable, and wherein the nest host nominated by the first type does not include a nest member attribute and wherein the data identifying the particular nestmate criterion that has not been met comprises data indicating that the nest host nominated by the first type does not include a nest member attribute.

17. The method of claim 14, wherein determining that the particular nestmate criterion has not been met comprises determining that a nest host nominated by the first type is resolvable, and that a nest member attribute of the nest host nominated by the first type does not include the first type and wherein the data identifying the particular nestmate criterion that has not been met comprises data indicating that the nest member attribute of the nest host nominated by the first type does not include the first type.

18. The method of claim 14, wherein determining that the particular nestmate criterion has not been met comprises determining that a nest host nominated by the second type is unresolvable, and wherein the data identifying the particular nestmate criterion that has not been met comprises an exception indicating that the nest host nominated by the second type is unresolvable.

19. The method of claim 14, wherein determining that the particular nestmate criterion has not been met comprises determining that a nest host nominated by the second type is resolvable, and wherein the nest host nominated by the second type does not include a nest member attribute and wherein the data identifying the particular nestmate criterion that has not been met comprises data indicating that the nest host nominated by the second type does not include a nest member attribute.

20. The method of claim 14, wherein determining that the particular nestmate criterion has not been met comprises determining that a nest host nominated by the second type is resolvable, and that a nest member attribute of the nest host nominated by the second type does not include the second type and wherein the data identifying the particular nestmate criterion that has not been met comprises data indicating that the nest member attribute of the nest host nominated by the second type does not include the second type.

21. The method of claim 14, wherein determining that the particular nestmate criterion has not been met comprises determining that nestmate data associated with the second type disallows access by the first type, and wherein the data identifying the particular nestmate criterion that has not been met comprises an indication that the data associated with the second type disallows access by the first type.

22. The method of claim 14, wherein determining that the particular nestmate criterion has not been met comprises determining a security policy preventing the first type from being a nestmate with the second type, and wherein the data identifying the particular nestmate criterion that has not been met comprises a description of the determined security policy.

23. The method of claim 14, wherein determining that the particular nestmate criterion has not been met comprises determining that the first type has a version number pre-dating use of run-time nests, and wherein the data identifying the particular nestmate criterion that has not been met comprises (a) a name of the first type and (b) a version number of the first type.

24. The method of claim 14, wherein determining that the particular nestmate criterion has not been met comprises determining that the second type has a version number pre-dating use of run-time nests, and wherein the data identifying the particular nestmate criterion that has not been met comprises (a) a name of the second type and (b) a version number of the second type.

25. The method of claim 14, wherein the operations further comprise determining a nest host of the first type to be the first type.

26. The method of claim 14,
wherein the data identifying the particular nestmate criterion that has not been met comprises at least one of the nest host of the first type or the nest host of the second type.

27. A system comprising:
at least one device including a hardware processor;
the system being configured to perform operations comprising:
detecting, at runtime, an instruction in a first type that attempts to access a private member of a second type;
evaluating one or more nestmate criteria to determine whether the first type and the second type are within a same nest, at least by:
determining a nest host of the first type;
determining a nest host of the second type;
comparing the nest host of the first type and the nest host of the second type to determine whether the nest host of the first type is the same as the nest host of the second type;
wherein a nest host corresponding to the nest specifies each nest member corresponding to the nest, and wherein each nest member corresponding to the nest specifies an association with the nest;
responsive to determining that a particular nestmate criterion, of the one or more nestmate criteria, is not met, determining that the first type and the second type are not within the same nest;
responsive to determining that the first type and the second type are not within the same nest:
recording or displaying data identifying the particular nestmate criterion that has not been met; and
throwing an illegal access error.

28. The system of claim 27, wherein determining that the particular nestmate criterion has not been met comprises determining that a nest host nominated by the first type is unresolvable, and wherein the data identifying the particular nestmate criterion that has not been met comprises an exception indicating that the nest host nominated by the first type is unresolvable.

29. The system of claim 27, wherein determining that the particular nestmate criterion has not been met comprises determining that a nest host nominated by the first type is resolvable, and wherein the nest host nominated by the first type does not include a nest member attribute and wherein the data identifying the particular nestmate criterion that has not been met comprises data indicating that the nest host nominated by the first type does not include a nest member attribute.

30. The system of claim 27, wherein determining that the particular nestmate criterion has not been met comprises determining that a nest host nominated by the first type is resolvable, and that a nest member attribute of the nest host nominated by the first type does not include the first type and wherein the data identifying the particular nestmate criterion that has not been met comprises data indicating that the nest member attribute of the nest host nominated by the first type does not include the first type.

31. The system of claim 27, wherein determining that the particular nestmate criterion has not been met comprises determining that a nest host nominated by the second type is unresolvable, and wherein the data identifying the particular nestmate criterion that has not been met comprises an exception indicating that the nest host nominated by the second type is unresolvable.

32. The system of claim 27, wherein determining that the particular nestmate criterion has not been met comprises determining that a nest host nominated by the second type is resolvable, and wherein the nest host nominated by the second type does not include a nest member attribute and wherein the data identifying the particular nestmate criterion that has not been met comprises data indicating that the nest host nominated by the second type does not include a nest member attribute.

33. The system of claim 27, wherein determining that the particular nestmate criterion has not been met comprises determining that a nest host nominated by the second type is resolvable, and that a nest member attribute of the nest host nominated by the second type does not include the second type and wherein the data identifying the particular nestmate criterion that has not been met comprises data indicating that the nest member attribute of the nest host nominated by the second type does not include the second type.

34. The system of claim 27, wherein determining that the particular nestmate criterion has not been met comprises determining that nestmate data associated with the second type disallows access by the first type, and wherein the data identifying the particular nestmate criterion that has not been met comprises an indication that the data associated with the second type disallows access by the first type.

35. The system of claim 27, wherein determining that the particular nestmate criterion has not been met comprises determining a security policy preventing the first type from being a nestmate with the second type, and wherein the data identifying the particular nestmate criterion that has not been met comprises a description of the determined security policy.

36. The system of claim 27, wherein determining that the particular nestmate criterion has not been met comprises determining that the first type has a version number pre-dating use of run-time nests, and wherein the data identifying the particular nestmate criterion that has not been met comprises (a) a name of the first type and (b) a version number of the first type.

37. The system of claim 27, wherein determining that the particular nestmate criterion has not been met comprises determining that the second type has a version number pre-dating use of run-time nests, and wherein the data identifying the particular nestmate criterion that has not been met comprises (a) a name of the second type and (b) a version number of the second type.

38. The system of claim 27, wherein the operations further comprise determining a nest host of the first type to be the first type.

39. The system of claim 27,
wherein the data identifying the particular nestmate criterion that has not been met comprises at least one of the nest host of the first type or the nest host of the second type.

\* \* \* \* \*